United States Patent [19]
Wang et al.

[11] Patent Number: 5,548,742
[45] Date of Patent: Aug. 20, 1996

[54] METHOD AND APPARATUS FOR COMBINING A DIRECT-MAPPED CACHE AND A MULTIPLE-WAY CACHE IN A CACHE MEMORY

[75] Inventors: Wen-Hann Wang, Portland; Konrad K. Lai, Aloha, both of Oreg.

[73] Assignee: Intel Corporation, Santa Clara, Calif.

[21] Appl. No.: 288,923

[22] Filed: Aug. 11, 1994

[51] Int. Cl.$^6$ .................................................... G06F 13/14
[52] U.S. Cl. ........................................... 395/455; 395/471
[58] Field of Search .................................. 395/455, 460, 395/463, 471, 472

[56] References Cited

U.S. PATENT DOCUMENTS

| | | | |
|---|---|---|---|
| 4,631,660 | 12/1986 | Woffinden et al. | 395/403 |
| 5,228,134 | 7/1993 | MacWilliams et al. | 395/465 |
| 5,257,360 | 10/1993 | Schnizlein et al. | 315/445 |
| 5,325,511 | 6/1994 | Collins et al. | 395/455 |
| 5,353,425 | 10/1994 | Malany et al. | 395/471 |
| 5,355,467 | 10/1994 | MacWilliams et al. | 395/473 |
| 5,367,659 | 11/1994 | Iyengar et al. | 395/463 |
| 5,369,753 | 11/1994 | Tipley | 364/DIG. 1 X |

FOREIGN PATENT DOCUMENTS

0271187A2  6/1988  European Pat. Off. .

OTHER PUBLICATIONS

Anant Agarwal, et al., "Column-Associative Caches: A Technique for Reducing the Miss Rate of Direct-Mapped Caches", Proceedings of the Annual International Symposium on Computer Architecture, May 1993, pp. 179–190.

Search Report from The U.K. Patent Office dated 1 Aug. 1995.

R. E. Kessler, et al., "Inexpensive Implementations of Set-Associativity", Proceedings of the 16th Annual International Symposium on Computer Architecture, May 1989, pp. 131–139.

Val Popescu, et al., "The Metaflow Architecture", IEEE Micro, Jun. 1991, pp. 10–13 and 63–73.

PCT International Search Report dated Mar. 5, 1996.

*Primary Examiner*—David L. Robertson
*Attorney, Agent, or Firm*—Blakely, Sokoloff, Taylor & Zafman

[57] ABSTRACT

A two-way set-associative cache memory includes both a set array and a data array in one embodiment. The data array comprises multiple elements, each of which can contain a cache line. The set array comprises multiple sets, with each set in the set array corresponding to an element in the data array. Each set in the set array contains information which indicates whether an address received by the cache memory matches the cache line contained in its corresponding element of the data array. The information stored in each set includes a tag and a state. The tag contains a reference to one of the cache lines in the data array. If the tag of a particular set matches the address received by the cache memory, then the cache line associated with that particular set is the requested cache line. The state of a particular set indicates the number of cache lines mapped into that particular set.

32 Claims, 12 Drawing Sheets

METHOD AND APPARATUS FOR COMBINING A DIRECT-MAPPED CACHE AND A MULTIPLE-WAY CACHE IN A CACHE MEMORY

BACKGROUND OF THE INVENTION

1. Field of the Invention

The present invention pertains to the field of data storage. More particularly, this invention relates to cache memory subsystems.

2. Background

Computer technology is continuously advancing, resulting in microprocessors which operate at faster and faster speeds. In order to take full advantage of these higher-speed microprocessors, data storage capabilities must keep up with the increased speed. High speed memory, however, is very expensive, with the cost being further amplified by the large amount of memory which many modern software programs require.

One solution to the problem of expensive memory is that of a cache memory subsystem. A cache memory subsystem is a memory unit which is generally much smaller than the system memory unit but which operates at a significantly higher speed than the system memory. The goal of the cache memory is to contain the information (whether it be data or instructions) that the microprocessor is going to use next. This information can then be returned to the microprocessor much more quickly, due to the higher speed of the cache memory.

The operation of cache memory subsystems varies, however, in general, data is swapped between the system memory and the cache memory. When the microprocessor requests information from memory, for example, either an instruction it is going to execute or data related to an instruction, it sends the memory address of the desired information to the cache memory. If the cache memory contains the information, it issues a signal to the microprocessor indicating so; this signal is generally termed a "hit." The cache memory then returns the requested information to the microprocessor. Thus, the microprocessor receives the requested information more quickly due to the faster speed of the cache memory.

If, however, the cache memory does not contain the information requested by the microprocessor, then a signal, generally termed a "miss," is returned to the microprocessor. The miss indicates to the microprocessor that it must retrieve the information from the slower system memory. Alternatively, the cache memory controller may retrieve the information from the system memory, and return it to the microprocessor. Regardless of which subsystem retrieves the information from the system memory, the retrieved information is also stored in the cache memory. In order to store this information in the cache memory, however, other data in the cache may need to be overwritten. That is, other information may be contained in the location the new information is to be written into. In some systems, this situation is resolved by transferring the information stored in a particular location of the cache memory into system memory and transferring the information stored in system memory into that particular location of the cache memory.

Whether the cache memory must transfer the information in a particular location to the system memory is also dependent on the cache policy employed. For example, some cache policies transfer the information to the system memory whenever the information in the cache is updated. Thus, when retrieving new information from the system memory, information in the cache need not be transferred to the system memory.

The cache memory is generally much smaller than the system memory. Thus, only a portion of the memory address, referred to as the cache index, is used as an index into the cache memory. A second portion of the memory address, generally referred to as the "tag portion", is used to determine whether the information stored in the cache memory is the requested information. Thus, multiple system memory addresses reference the same slot in the cache memory. When the microprocessor requests a memory address which corresponds to a slot in the cache memory which is already used by another cache line, then a conflict occurs.

Cache memory subsystems are frequently divided into multiple cache lines, with the cache index portion of the memory address corresponding to one of these cache lines. Each cache line includes multiple bytes, with the particular byte requested by the microprocessor being indicated in the memory address as an offset. The system memory is also often divided into the same line size as the cache memory. These lines in the system memory are referred to as data lines.

One type of cache memory subsystem for resolving cache line conflicts is known in the art as a direct-mapped cache. In a direct-mapped cache, when a conflict occurs, the cache line stored in the cache is transferred to system memory and the data line corresponding to the request from the microprocessor is transferred to that location in the cache memory. Such a caching system has several advantages. First, the hardware complexity for implementing the cache is relatively simple. The tag of the location is compared to the request, and the cache line is returned to the microprocessor if they match, or the data is retrieved from system memory if they do not match.

Second, the cost of the cache memory subsystem is relatively small. The reasoning for this is two-fold. The reduced logic complexity discussed above reduces the financial cost of the system. In addition, the low complexity allows the cache memory to utilize static random access memory (SRAM) cells. SRAMs are widely available, and are inexpensive relative to many other types of memory cells.

The direct-mapped cache, however, performs poorly under certain circumstances. For example, memory address A and memory address B may both reference the same cache location, location X. If the microprocessor initially requests memory address A, then the data in address A is stored in location X. If the microprocessor requests address B on the next clock cycle, then the data in location X is returned to the system memory (at address A), and the data in address B is stored in location X. The next request by the microprocessor may then be for address A again. Thus, the data in location X is returned to the system memory (at address B), and the data in address A is again stored in location X. Therefore, a very poor hit ratio (that is, the number of cache hits relative to the total number of accesses to the cache) will occur if the microprocessor makes requests in the following order: address A, address B, address A, address B, address A, address B, etc. Thus, it can be seen that the performance of a direct-mapped cache suffers when the microprocessor alternately requests addresses A and B.

A second type of cache memory which resolves this performance disadvantage is a two-way set-associative cache memory. A two-way set-associative cache includes two "ways," which can be thought of as two direct-mapped caches operating together (for this reason, a direct-mapped cache is sometimes referred to as a one-way cache). In a two-way cache, if a conflict occurs, then the data stored in the first way of the cache is transferred to the second way of the cache, and the new data is retrieved from the system memory into the first way of the cache. Thus, both data lines are stored in the cache memory. Therefore, if the microprocessor continuously switches between requesting address A and address B as described above, each request will hit the cache, resulting in a higher hit ratio. Both data lines remain in the cache until a second conflict occurs; that is, a third request which accesses the same location.

Thus, it can be seen that the two-way cache resolves some of the performance problems in the direct-mapped cache. However, this increased performance has several costs. First, the logic complexity to operate a two-way cache is greater. Additional logic must be included to monitor both cache lines in both ways, and return the proper data when a request from the microprocessor hits the cache. Second, two-way caches generally use customized memory cells, rather than standard SRAMs. Thus, the financial cost of the cache system is increased.

A third cost consideration is that power consumption in a two-way cache is greater than that of a direct-mapped cache. The direct-mapped cache accesses only a single cache line to determine if a hit occurs. However, in a two-way cache, both cache lines are accessed to determine if a hit occurs, with the proper line being returned to the microprocessor if a hit does occur. Thus, it can be seen that the two-way cache utilizes twice the power of the direct-mapped cache, since it is accessing twice as many cache lines.

Thus, it would be advantageous to provide a cache memory subsystem which operates quickly to take advantage of the increased speed of modern microprocessors. The present invention provides such a solution.

Furthermore, it would be advantageous to provide a cache memory subsystem which had the advantages of both a direct-mapped cache and the increased performance of the two-way cache. The present invention provides a cache memory characterized as being less complex, having a lower cost, and lower power usage than the 2-way cache. The present invention also provides higher hit ratios as compared to conventional direct-mapped caches.

SUMMARY OF THE INVENTION

A two-way set-associative cache memory is described herein. In one embodiment, the cache memory includes both a set array and a data array. The data array comprises multiple elements, each of which can contain a cache line. The set array comprises multiple sets, each of which corresponds to an element in the data array. Each set in the set array contains information which indicates whether an address received by the cache memory matches the cache line in its corresponding element of the data array (assuming the element contains a cache line).

Each set includes tag information and state information. The tag information is a reference to one of the cache lines in the data array. If the tag of a particular set matches the tag portion of the address received by the cache memory, then the cache line associated with that particular set is the requested cache line. The state information of a particular set indicates the number of cache lines mapped into that particular set.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances, well known methods, procedures, components, and circuits have not been described in detail so as not to obscure aspects of the present invention.

Figure 1:
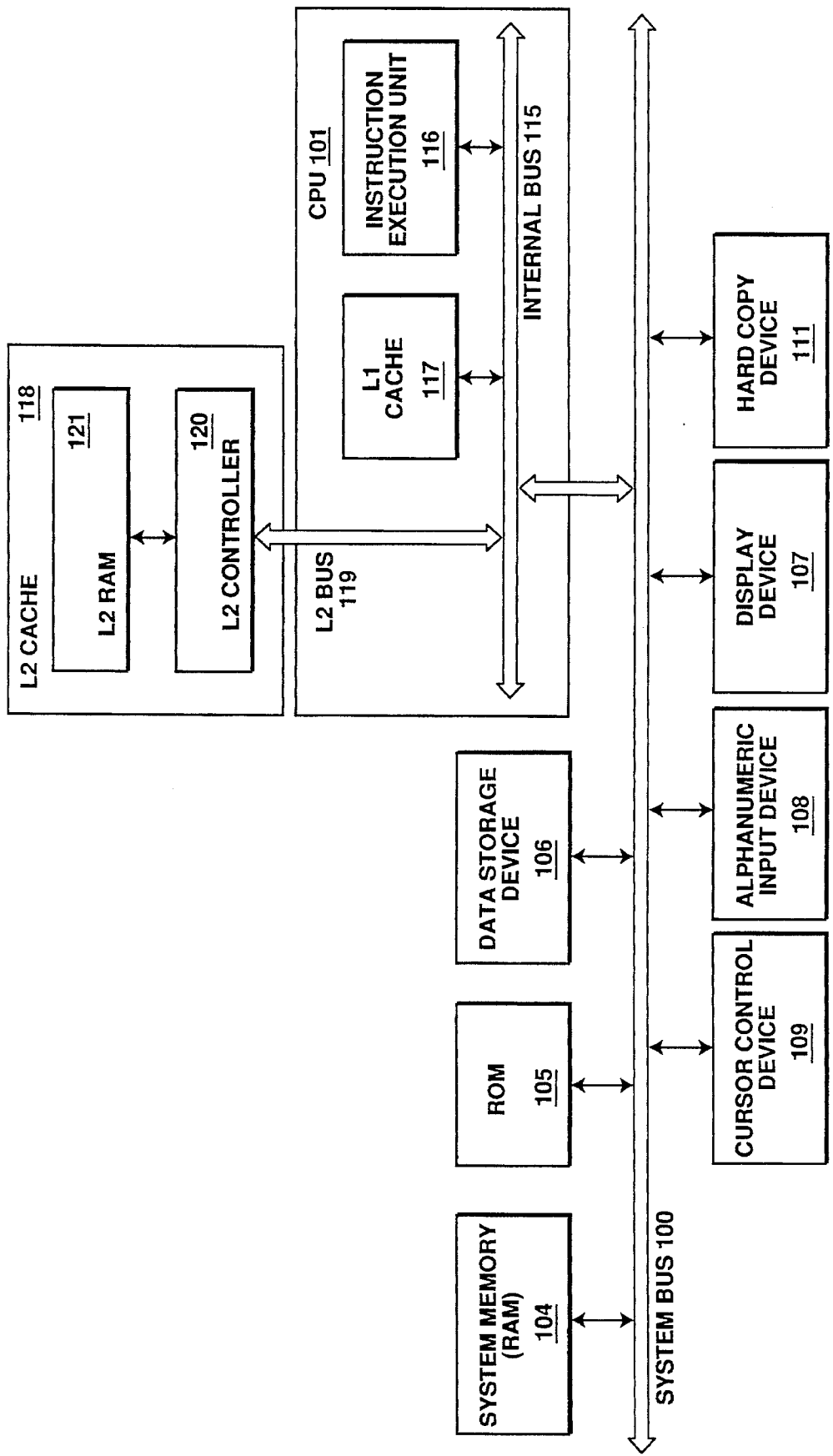
FIG. 1 shows an overview of an example computer system of the present invention.

FIG. 1 shows an overview of an example computer system of the present invention. The computer system generally comprises a system bus or other communication device 100 for communicating information, and a central processing unit (CPU) 101 coupled with bus 100 for processing information and instructions. In one implementation, the present invention includes an Intel® architecture microprocessor as CPU 101; however, the present invention may utilize any type of microprocessor architecture. In one embodiment, bus 100 includes address, data and control buses. The computer system also includes a system memory or random access memory (RAM) 104 coupled with bus 100 for storing information and instructions for CPU 101, a read only memory (ROM) 105 coupled with bus 100 for storing static information and instructions for CPU 101, a data storage device 106 such as a magnetic disk and disk drive coupled with bus 100 for storing information and instructions, a display device 107 coupled to bus 100 for displaying information to the computer user, an alphanumeric input device 108 including alphanumeric and function keys coupled to the bus 100 for communicating information and command selections to CPU 101, a cursor control device 109 coupled to bus 100 for communicating user input information and command selections to CPU 101, and a hard copy device 111, such as a plotter or printer, coupled to bus 100 for providing a visual representation of the computer images.

The display device 107 utilized with the computer system of the present invention may be a liquid crystal device, cathode ray tube, or other display device suitable for creating graphic images and alphanumeric characters (and ideographic character sets) recognizable to the user. The cursor control device 109 allows the computer user to dynamically signal the two dimensional movement of a visible symbol (e.g., a cursor or pointer) on a display screen of the display device 107. Many implementations of the cursor control device are known in the art including a trackball, mouse, joystick or special keys on the alphanumeric input device 108 capable of signaling movement of a given direction or manner of displacement. It is to be appreciated that the cursor also may be directed and/or activated via input from the keyboard using special keys and key sequence commands. Alternatively, the cursor may be directed and/or activated via input from a number of specially adapted cursor directing devices, including those uniquely developed for the disabled.

CPU 101 includes an internal bus or other communication device 115 for communicating information between components within CPU 101, as well as components external to CPU 101. An instruction execution unit 116 is also included in CPU 101. The instruction execution unit 116 retrieves and executes instructions, and retrieves data, from data storage devices within the computer system. These data and instructions can be stored in system memory 104, ROM 105, data storage device 106, etc. A level-one (L1) cache 117 is also included in CPU 101 for storing data and instructions for use by execution unit 116. It should be noted that CPU 101 contains additional components, however these have not been shown so as not to clutter the drawings and obscure the present invention.

CPU 101 is coupled to a level two (L2) cache 118 via L2 bus 119. L2 cache 118 is an additional cache for storing data and instructions for use by execution unit 116. In one embodiment of the present invention, L2 cache 118 is both larger and slower than L1 cache 117. L2 Cache 118 includes L2 controller 120 for controlling the operation of L2 cache 118, and also L2 RAM 121 for storing the data and instructions contained in L2 cache 118. In the embodiment shown, L2 controller 120 is included in L2 cache 118. Alternatively, L2 controller 120 could be included in CPU 101.

It will be appreciated that the computer system of FIG. 1 is exemplary only. In some implementations of the present invention, additional processors or other components may be included in the computer system. Furthermore, certain implementations of the present invention may not require nor include all of the above components. For example, display device 107 or hard copy device 111 may not be coupled to bus 100. Furthermore, certain implementations may couple components in a different manner. For example, L2 cache 118 may be connected directly to system bus 100 rather than to internal bus 115.

Figure 2:
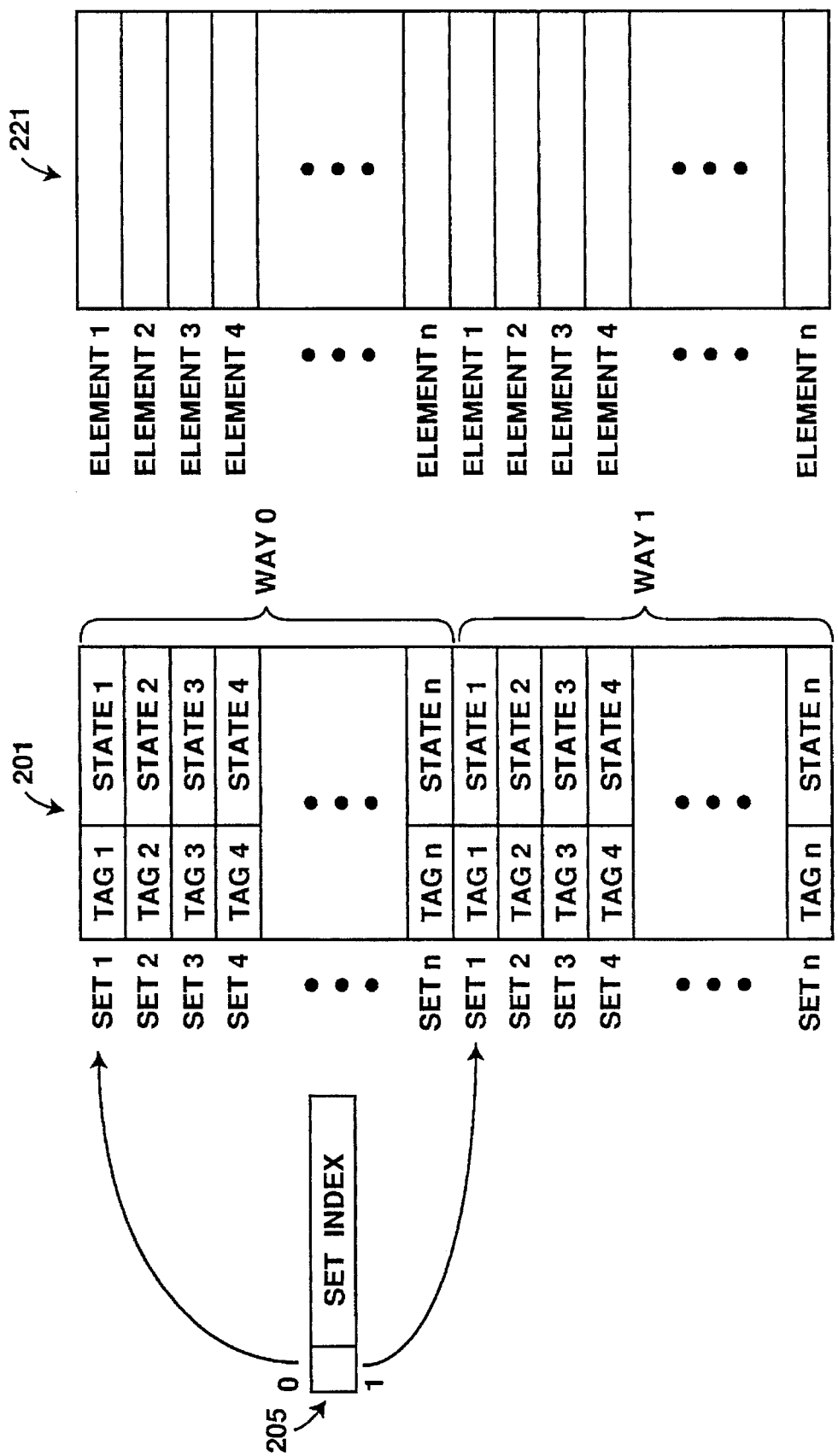
FIG. 2 shows the set array and corresponding data array of a cache memory in one embodiment of the present invention.

FIG. 2 shows a cache index or set array 201 and a corresponding data array 221 of a cache memory in one embodiment of the present invention. Set array 201 includes 2-n data sets, and data array 221 includes 2-n elements. Each data set of set array 201 corresponds to a single element in data array 221.

Set array 201 as shown is a single, physically contiguous array. However set array 201 can be treated as a two-way set-associative cache. This is shown in FIG. 2 by way 0 and way 1, with each way comprising n sets. An address received by the cache memory contains a portion which is a set index, such as set index 205. Set index 205 uniquely identifies one particular set within set array 201, whether that set be in way 0 or way 1. Thus, the size (that is, number of bits) of set index 205 is determined by the number of sets within set array 201.

Given the division of way 0 and way 1 shown in FIG. 2, the difference between a set index which identifies a set in way 0 and a set index which identifies a set in way 1 is the most significant bit of the set index. For example, if all the bits of set index 205 are zeroes, including the most significant bit, then set index 205 maps to set 1 of way 0 of set array 201. However, if the most significant bit of set index 205 is a one and all other bits are zeros, then that set index 205 maps indexes into set 1 of way 1 of set array 201.

Thus, it can be seen that set array 201 can operate essentially as a direct-mapped cache. That is, each set index into set array 201 maps into one particular set of set array 201. However, it should be noted that to access the corresponding set of a different way, the most significant bit of the set index need only be flipped. Thus, for example, given the set index for set 4 of way 1, if the user desired to access set 4 of way 0, the most significant bit of the set index would simply need to be flipped to 0.

In one embodiment of the present invention, each set in set array 201 includes a tag field and a state field. The tag field of a particular set identifies the cache line stored in the corresponding element of data array 221. For example, the tag field of set 2 of way 0 in set array 201 indicates the memory address of element 2 of data array 221. The information stored in the tag field of a particular set is received as part of the memory address request from the processor. The state field of a particular set within set array 201 indicates the number of cache lines that are mapped into the set, as described in more detail below. In an alternate embodiment of the present invention, two set arrays are utilized. One set array contains the tag fields, while the second set array contains the state fields. This embodiment is discussed in more detail below with reference to FIG. 4.

It will be appreciated by those skilled in the art that alternate embodiments of the present invention can utilize set arrays with additional information. For example, in one embodiment of the present invention, set array 201 includes parity bits for each set used for error checking and also includes status bits which reflect the validity of the cache line (for example, using the well-known MESI protocol).

In one implementation of the present invention, set array 201 comprises 1,024 sets in total. Thus, each way includes 512 sets, and set index 205 comprises ten bits. Therefore, data array 221 also includes 1,024 elements. In one embodiment of the present invention, each element within data array 221 is a single cache line for the computer system. In one implementation, the size of this cache line is 32 bytes. It will be appreciated, however, that these sizes for the set array, data array, and cache line are exemplary only; these components can be of any size.

As mentioned above, each set within set array 201 may include a state field. In one embodiment of the present invention the state field indicates the number of cache lines which are mapped into this particular set. Each set index uniquely identifies one set of set array 201. However, since multiple data lines can have the same set index, when the data lines are transferred to the cache as cache lines, the present invention allows a set index to map to multiple cache lines. In this embodiment, three possible states exist for the state field. These three states are: direct, paired, and borrowed.

The direct state indicates that only a single cache line is mapped into this set. That is, only one cache line is associated with the set. A set in direct state can transition to either borrowed state or paired state, or remain in direct state.

A set in paired state indicates that two cache lines are mapped into this set. That is, two cache lines are associated with this set. In this situation, the information associated with one of the cache lines (that is, the tag, state, data, etc.) is stored in this set and its corresponding data array elements. This set is then termed the "primary" set. The information associated with the second cache line is stored in the corresponding set and data array element of the other way, which is termed the "partner" set. The partner set can be accessed by simply flipping the most significant bit of the set index for the primary set. For example, if the primary set is set 4 of way 0, then the partner set is set 4 of way 1. A set which is in paired state can transition to direct state, or remain in paired state.

If a set is in borrowed state, no cache lines are mapped into this set. This indicates one of two things; first, this set may be used by the corresponding set of the other way. That is, the corresponding set of the other way is in paired state and the second cache line is mapped into this set. Second, the corresponding set of the other way may also be in borrowed state, indicating that no cache lines are mapped into either this set or the corresponding set of the other way (that is, this set's partner set). A set in borrowed state can either transition to direct state or remain in borrowed state. At system start-up, all sets in set array 201 are initialized to the borrowed state.

It should be noted that each pair of corresponding sets (where the set indexes of a pair of corresponding sets differ only in the most significant bit) is a primary/partner set combination. Either set can be the primary set and either set can be the partner set. Which set is the primary set and which set is the partner set is determined by the set indexed by the set index. The set indexed by the set index is the primary set; the corresponding set in the other way is the partner set. It should also be noted that which set is the primary set may also be dependent on which of the two sets has been most recently used, as discussed in more detail below.

It should further be noted that whenever a particular set is in paired state, that set's partner set is in borrowed state. By using the paired/borrowed states, a two-way cache is created. That is, if a particular set is in paired state, then it contains the information for one cache line and its partner set contains the information for the second cache line mapped to this set.

Thus, it can be seen that the cache memory behaves as a direct-mapped cache until a conflict between two cache lines occurs. When such a conflict occurs, the cache memory behaves as a two-way set-associative cache.

By utilizing the state fields within set array 201, a preliminary determination as to whether a request hits the cache or misses the cache can be made for some requests. If the request received from the processor indexes a set which is in borrowed state, then the request is guaranteed to be a miss. That is, the borrowed state indicates that no cache lines are mapped into this set. Thus, there is no need to compare the tag of the request to the tag of either the primary set or the partner set of set array 201.

If the request from the processor indexes into a set which is in direct state, then the request may either hit or miss the cache. The tag field for the indexed set must be compared with the tag field of the request from the processor to determine whether or not a hit occurs. However, the partner set need not be checked because direct state indicates only a single line is mapped into this set. Thus, the tag field of only a single set need be compared with the tag field of the address received from the processor. Thus, it will be understood by those skilled in the art that when each set of set array 201 is in either direct or borrowed state the cache behaves as a direct-mapped cache.

If the request from the processor indexes a set within set array 201 which is in paired state, then the request may either hit or miss the cache. In one implementation of the present invention, the tag field of the request is first compared to the tag field in the primary set. If the tag fields match, then the cache line associated with the primary set is returned to the processor. However, if the tag field of the primary set does not match the tag field of the request, then the tag field of the partner set is compared with the tag field of the request. If the tag of the partner set and the tag field of the request match, then the cache line associated with the partner set is returned to the processor. Otherwise, a miss indication is returned to the processor.

Thus, when a set is in paired state, that set and its partner set behave much like a two-way cache. However, the two sets do not operate exactly as a two-way cache because the second set is accessed only when the first set is a miss.

In one implementation of the present invention, the primary set is the most recently used (MRU) set. The MRU set is the set which has been most recently accessed by the processor. Thus, the primary set could be either set of the primary set-partner set pair, as discussed in more detail below.

Figure 4:
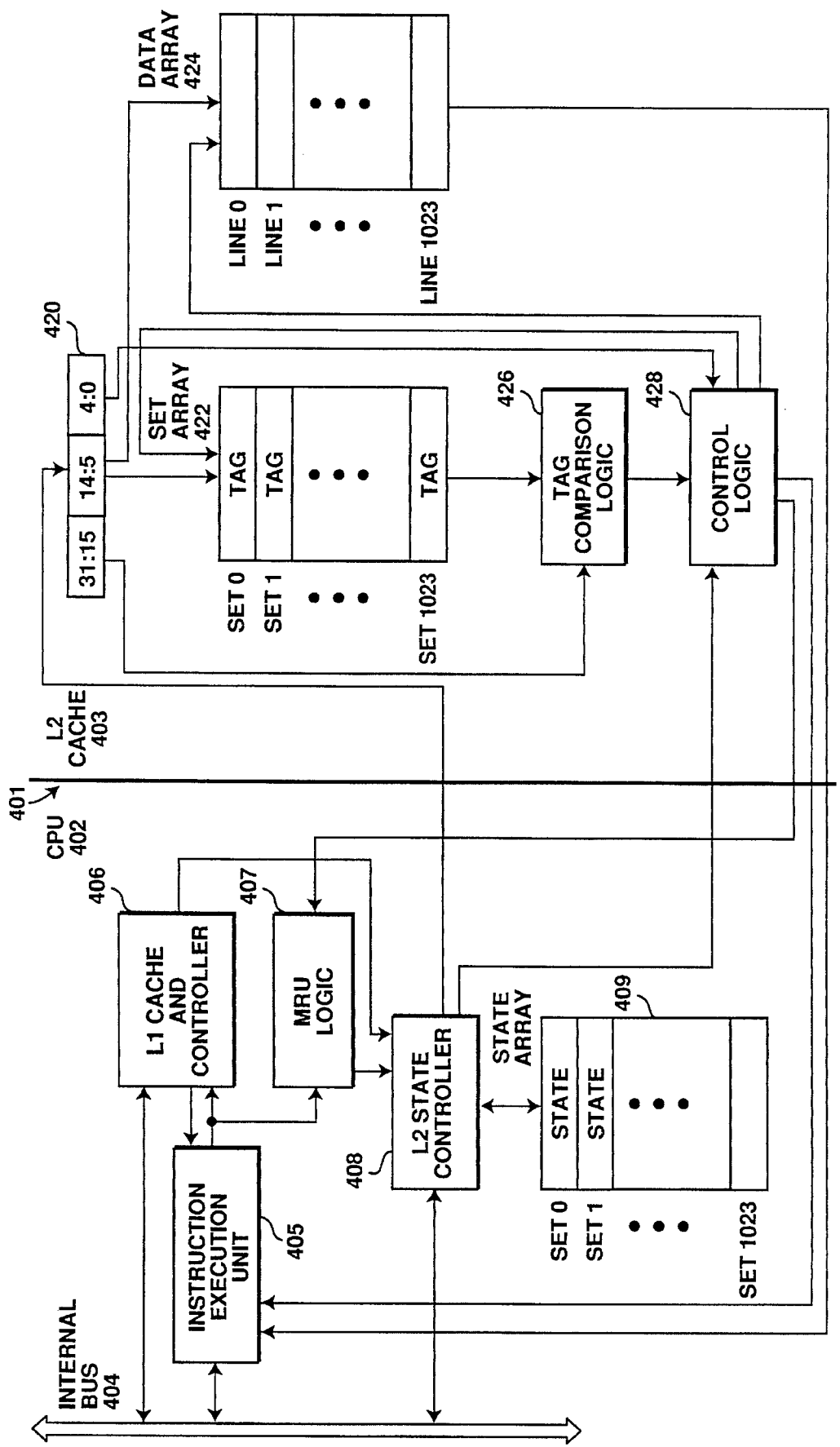
FIG. 4 is a block diagram of a cache memory subsystem in one embodiment of the present invention.
Figure 6:
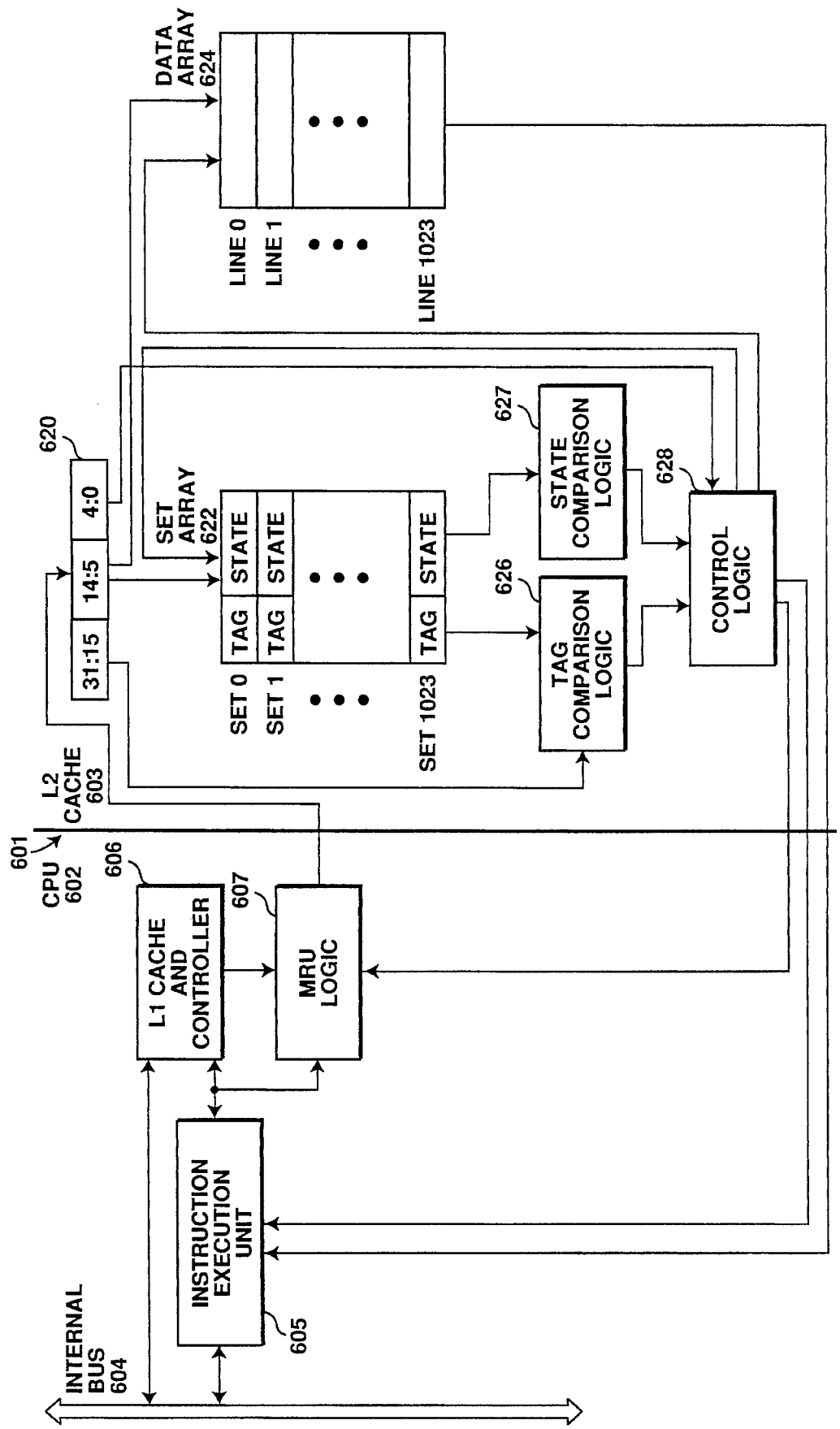
FIG. 6 is a block diagram of a cache memory subsystem in an alternate embodiment of the present invention.

In the embodiments of FIG. 4 and FIG. 6, MRU logic is utilized when accessing the L2 cache. The MRU logic (or indicator) indicates which of the primary set-partner set pair has been most recently accessed by the processor. In the embodiments of FIGS. 4 and 6, the MRU set is termed the primary set, and the least recently used (LRU) set is termed the partner set. When the request from the processor is a miss, the cache line of either the primary set or the partner set is transferred to the system memory to provide a free location for the cache line coming in from system memory. In one implementation, the cache line which is least recently used (that is, the partner set) is the one which is swapped with the cache line coming in from system memory. Thus, by utilizing the MRU logic, the proper cache line to transfer to system memory is known.

Figure 3A:
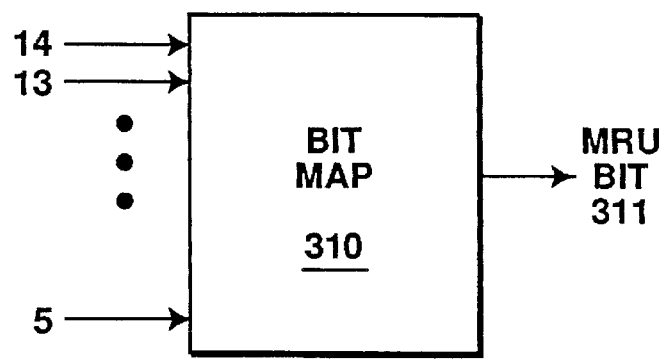
FIG. 3A shows a bit map for determining the most recently used set information in one embodiment of the present invention.

FIG. 3A shows a bit map for determining the most recently used set information in one embodiment of the present invention. FIG. 3A shows a bit map 310 having ten input lines and one output line. The ten input lines to bit map 310 are the ten bits of the set index into set array 201. Thus, with ten inputs, bit map 310 can access 1,024 unique locations. Given these ten inputs, bit map 310 outputs a single bit, MRU bit 311, which is the MRU indicator for the particular set which was input to bit map 310. In one implementation, if MRU bit 311 is a "0", then the most recently used set is determined by not flipping the most significant bit of the set index. However, if MRU bit 311 is a "1" then the most recently used set is indicated by flipping the most significant bit of the set index. For example, the set index indexes a set within set array 201. If MRU bit 311 is a "0", then that set index is the index of the primary set. However, if the MRU bit 311 is a "1", then that set index is the index of the partner set.

Figure 3B:
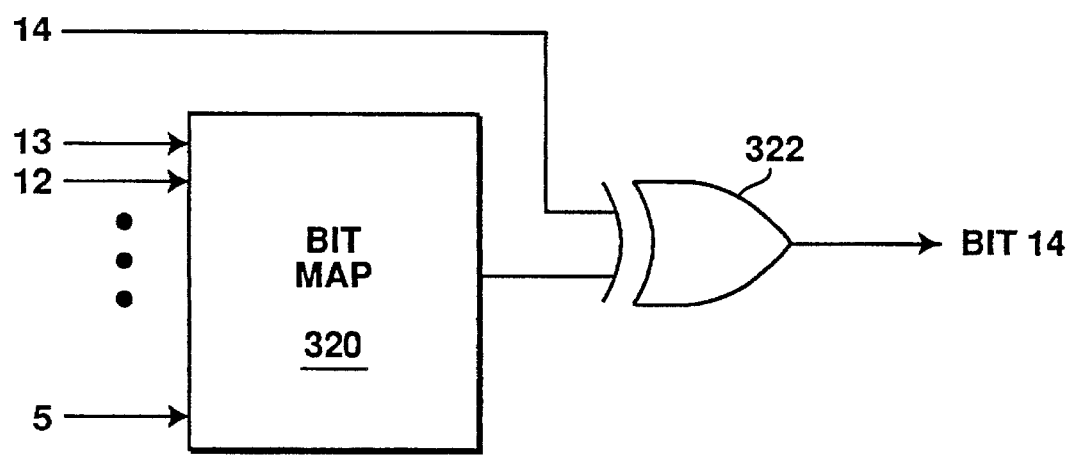
FIG. 3B shows the logic circuitry for determining the most recently used set information in an alternate embodiment of the present invention.

FIG. 3B shows the logic circuitry for determining the most recently used set information in an alternate embodiment of the present invention. FIG. 3B shows a bit map 320 having nine input lines. These nine input lines are the nine least significant bits of the set index of the address received from the processor. The most significant bit of the set index is input into a conventional exclusive-or gate 322, along with the output from bit map 320. The output of exclusive-or gate 322 is then used as the most significant bit of the set index (that is, bit 14), rather than the most significant bit which was input to gate 322. Thus, the result of the circuitry in FIG. 3B indicates the actual most significant bit, rather than whether to flip the most significant bit as described in FIG. 3A.

In one embodiment of the present invention, the MRU logic is initialized by setting each location in the bit map (either bit map 310 of FIG. 3A or bit map 320 of FIG. 3B) to "0" at system start-up. In this embodiment, the MRU logic can be implemented using the logic circuitry of either FIG. 3A or FIG. 3B. The MRU logic is then updated when a set transitions from direct state to paired state, as discussed in more detail below.

FIG. 4 is block diagram of a cache memory subsystem in one embodiment of the present invention. In this embodiment, both the MRU logic and the state information are stored in the same integrated circuit (IC) package as the CPU, and the level-two (L2) cache is contained in a separate IC package. FIG. 4 shows the logic circuitry for both CPU 402 and L2 cache 403. The separation between these two IC packages is shown by boundary line 401.

CPU 402 includes an instruction execution unit 405, a level-one (L1) cache and controller 406, MRU logic 407, L2 state controller 408, and state array 409. An internal bus 404 is also included within CPU 402 for communicating information between the various components of CPU 402. It will be understood by those skilled in the art that various additional components necessary for the operation of CPU 402, such as an arithmetic logic unit, are also included within CPU 402. These additional components, however, have not been shown in FIG. 4 so as not to clutter the drawing and obscure the present invention.

Instruction execution unit 405 executes instructions retrieved from programs operating in the computer system. This execution involves retrieving both instructions and data from the computer system's memory. When execution unit 405 requires additional instructions or data, it first requests the information from L1 cache and controller 406. If the request from execution unit 405 hits L1 cache 406, then the requested information is returned to execution unit 405. However, if the request from execution unit 405 misses L1 cache 406, then the address received by L1 cache controller 406 is input to L2 state controller 408. In one embodiment of the present invention, L1 cache and controller 406 is a conventional cache memory. In an alternate embodiment, L1 cache and controller 406 is a cache memory according to the present invention.

MRU logic 407 is the logic circuitry which provides the MRU information, such as shown in FIGS. 3A and 3B. The request from execution unit 405 is input into MRU logic 407 at the same time it is input into L1 cache 406, thereby allowing the MRU information for the particular set within L2 cache 403 to be accessed in parallel with L1 cache 406. Thus, the MRU information, such as MRU bit 311 discussed above in FIG. 3A or bit 14 discussed in FIG. 3B, is available to L2 state controller 408 at the same time the L1 cache and controller 406 outputs the address of the request to L2 state controller 408.

L2 state controller 408 receives input from both L1 cache 406 and MRU logic 407. L2 state controller 408 combines the MRU information received from MRU logic 407 with the least significant bits of the requested set index received from L1 cache 406. Thus, L2 state controller 408 generates the address for the primary set (that is, the most recently used set of the partner set-primary set pair).

L2 state controller 408 is also coupled to state array 409. State array 409 includes the state field for each set within the L2 cache. The state field for a particular set indicates whether that set is in direct, paired, or borrowed state. Thus, if the request misses the L1 cache then the L2 state controller 408 determines the state of the primary set for the request. Thus, preliminary information, such as whether the set is in borrowed state and therefore guaranteed to be a miss, can be accessed in the same IC package as the CPU 402, without accessing L2 cache 403. Therefore, under certain circumstances, a miss indication can be returned to execution unit 405 without incurring the time delay in accessing the separate IC package of L2 cache 403.

If the request misses L1 cache 406 and L2 state controller 408 determines that the set is in either direct or paired state, then L2 cache 403 is accessed. The requested address from execution unit 405 is input to L2 cache 403 from L2 state controller 408. This address is shown as address 420, comprising 32 bits. The 16 most significant bits of address 420 contain the tag field of the request from execution unit 405. This tag field is used to determine whether the cache line associated with the primary set matches the request, as discussed in more detail below. Bits [14:5]]of address 420 are the index into set array 422, as described above with reference to FIG. 2. The five least significant bits of address 420 are the offset within the cache line of data array 424. That is, bits [4:0] of address 420 indicate which byte within the requested cache line should be returned to execution unit 405 first in the event of a hit.

The primary set, based on address 420, is accessed and the tag for that set is input to tag comparison logic 426. The tag for the primary set is compared with the tag field from address 420 by tag comparison logic 426. The result of this comparison is then input to control logic 428. It should be noted that bits [14:5] of address 420 are also input to data array 424. Thus, the output of data array 424 is the cache line associated with the set indexed by address 420. If tag comparison logic 426 indicates that the tag of the primary set and the tag of address 420 match, then a hit indication is returned by control logic 428 to CPU 402, along with the cache line from data array 424.

However, if tag comparison logic 426 indicates that the tags do not match, then control logic 428 either checks the partner set or returns a miss, depending on whether the state of the primary set is direct or paired. The state of the primary set is received as input from L2 state controller 408. If the state of the primary set is direct, then control logic 428 returns a miss indication. However, if the state of the primary set is paired, then control logic 428 accesses both set array 422 and data array 424 using the set index of the least recently used (LRU) set. As discussed above, this is done by flipping the most significant bit of the set index, for example bit [14] of address 420. The tag from set array 422 of the LRU set is compared by tag comparison logic 426 with the tag received from address 420. The result of this comparison is then output to control logic 428. If tag comparison logic 426 indicates a hit, then the cache line from data array 424 associated with the LRU set is returned to CPU 402, along with a hit indication. However, if tag comparison logic 426 indicates a miss, control logic 428 returns a miss indication to CPU 402.

In one embodiment of the present invention, control logic 428 retrieves any data lines from system memory which are needed by L2 cache 403. In an alternate embodiment, L1 cache and controller 406 retrieves any needed data lines from the system memory. In another alternate embodiment, execution unit 405 retrieves any needed data lines from the system memory.

Figure 5A:
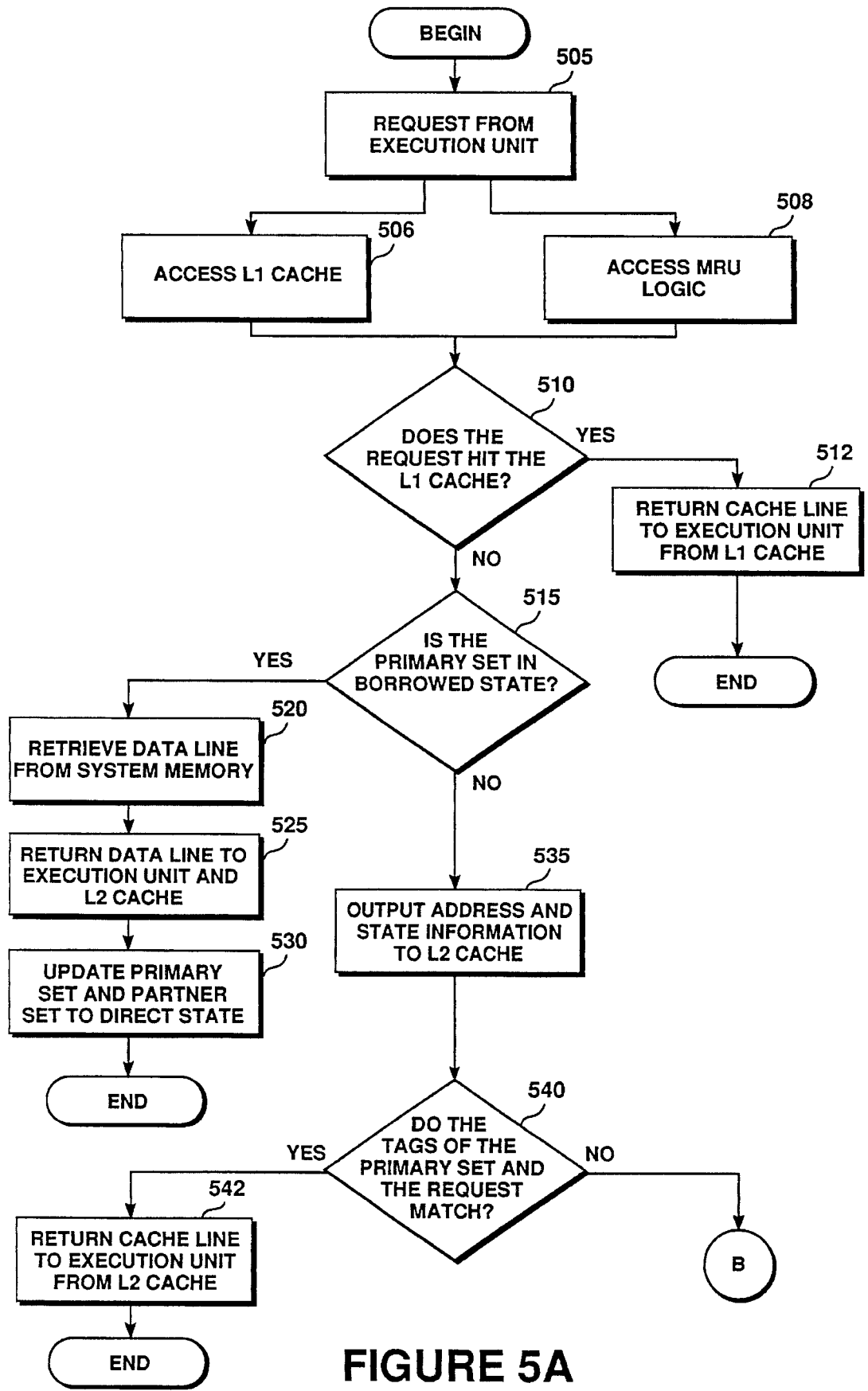
FIGS. 5A and 5B show the steps followed by one embodiment of the present invention in operating the cache memory subsystem of FIG. 4;.
Figure 5B:
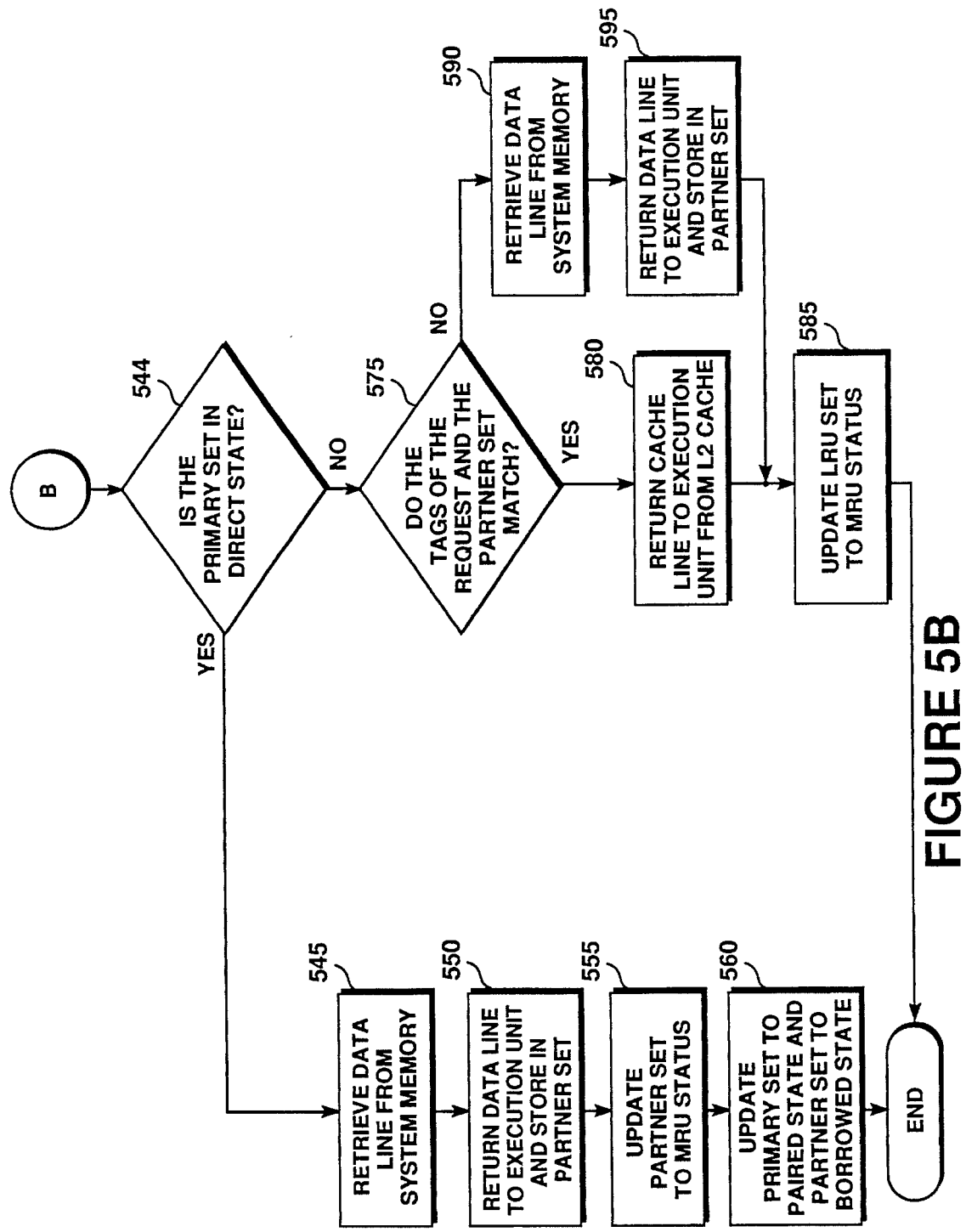

FIGS. 5A and 5B show the steps followed by one embodiment of the present invention in operating the cache memory subsystem of FIG. 4. A request for information is first issued from the execution unit of the CPU, step 505. In one implementation of the present invention, this request is in the form of an address, such as address 420 shown in FIG. 4. This request from the execution unit is used to access the L1 cache, step 506, and to access the MRU logic, step 508. As shown in FIG. 5A, steps 506 and 508 are performed in parallel.

Upon receiving the request from the execution unit, the L1 cache and controller determines whether the request hits the L1 cache, step 510. If the request hits the L1 cache, then the requested cache line is returned to the execution unit from the L1 cache, step 512, thereby satisfying the request. However, if the request misses the L1 cache, then the L2 state controller determines whether the primary set indexed by the request from the execution unit is in borrowed state, step 515. The primary set is the set indexed by the set address received from the execution unit as modified by the MRU information obtained in step 508. The partner set is the set indexed using the least significant bits of the primary set address and the most significant bit of the primary set address flipped. Thus, the primary set is the most recently used set, and the partner set is the least recently used set.

If the primary set is in borrowed state, then the L2 state controller immediately knows that the request from the execution unit misses the L2 cache. Thus, the requested data line is retrieved from system memory, step 520. The data line retrieved from system memory is then returned to the execution unit and also to the L2 cache, step 525. The cache line is then stored in the L2 cache in the data array line which corresponds to the primary set, and the state of the primary set and the partner set are both updated to direct state, step 530. In one implementation of the present invention, the cache line is also stored in the L1 cache.

Returning to step 515, if the primary set is not in borrowed state, then the L2 state controller outputs both the primary set address and an indication of whether the primary set is in direct or paired state to the L2 cache, step 535. The tag comparison logic in the L2 cache then determines whether the tag of the primary set and the requested address match, step 540. If the tags match, then the request hits the L2 cache and the cache line corresponding to the primary set is returned from the data array in the L2 cache to the execution unit, step 542.

If, however, the tags do not match in step 540, then the control logic in the L2 cache determines whether the primary set is in direct state, based on the input received from the L2 state controller, step 544 of FIG. 5B. If the primary set is in direct state, then the requested data line is retrieved from system memory, step 545. This data line is returned to the execution unit and is also stored in the partner set, step 550. In one implementation of the present invention, the data line is also stored in the L1 cache. The MRU logic is then updated, step 555, to indicate that the partner set is the most recently used set. The state of the primary set is then updated to paired state, and the partner set is updated to borrowed state, step 560.

In one embodiment of the present invention, the MRU logic includes a bit map with ten input lines, as shown in FIG. 3A. In this embodiment, the MRU logic is updated to indicate the partner set is the MRU set (step 555) by storing a "1" in the bit map at the location determined by the ten bits of the set index of the primary set and a "0" in the bit map at the location determined by the ten bits of the set index of the partner set. In an alternate embodiment of the present invention, the MRU logic includes a bit map with nine input lines, as shown in FIG. 3B. In this embodiment, the MRU logic is updated to indicate the partner set is the MRU set by flipping the bit in the bit map at the location determined by the nine least significant bits of the set index of the primary set.

Returning to step 544, if the state of the primary set is neither direct nor borrowed, then the primary set must be in paired state. The tag of the primary set was already found to not match the tag of the request in step 540. Thus, the tag comparison logic determines whether the tag of the partner set matches the tag of the request, step 575. If the request hits the partner set in step 575 (that is, the tags match), then the cache line associated with the partner set is returned from the L2 cache to the execution unit, step 580. The MRU logic is then updated to indicate that the previously least recently used set is now the most recently used set, step 585. The MRU logic is updated as discussed above in step 555.

Returning to step 575, if the request misses the partner set (that is, the tags do not match) then the requested data line is retrieved from system memory, step 590. This data line is then returned to both the execution unit and the L2 cache, step 595. In one implementation, the data line is also returned to and stored in the L1 cache. The L2 cache stores this data line in the partner set. The MRU logic is then updated to indicate that the previously least recently used set is now the most recently used set, step 585.

FIG. 6 is block diagram of a cache memory subsystem in an alternate embodiment of the present invention. The embodiment shown in FIG. 6 is similar to the embodiment shown in FIG. 4, however, the state information for each set within the set array is stored in the same IC package as L2 cache 603, rather than in the same IC package as CPU 602. FIG. 6 shows CPU 602 and L2 cache 603, separated by boundary line 601.

CPU 602 includes an internal bus 604, an instruction execution unit 605, and an L1 cache and controller 606. The operation of these components is as discussed above with reference to FIG. 4. CPU 602 also includes MRU logic 607, which is similar to MRU logic 407 of FIG. 4. However, MRU logic 607 determines whether to flip the most significant bit of the set index received from L1 cache 606 and also flips the most significant bit, if necessary, to obtain the index of the primary set. Thus, the set index portion of address 620, which is input to L2 cache 603 from MRU logic 607, contains the set index of the primary set (that is, the most recently used set). As discussed above with reference to address 420 of FIG. 4, address 620 of FIG. 6 comprises 32 bits. Bits [31:15] are the tag field of the address, bits [14:5] are the set index, and bits [4:0] are the offset into the cache line.

Each set of set array 622 includes a tag field and a state field. Set array 622 is indexed by bits [14:5] of address 620, with the tag information and state information of the indexed set being input to tag comparison logic 626 and state comparison logic 627, respectively. Tag comparison logic 626 compares the tag of the indexed set with the tag of address 620 and outputs the result to control logic 628. Similarly state comparison logic 627 determines the state of the indexed set, and outputs this information to control logic

628. State comparison logic 627 indicates that the set is either in direct state, paired state, or borrowed state.

Control logic 628 receives as input the result of the tag comparison from tag comparison logic 626, and the state of the indexed set from state comparison logic 627. Based on this information, control logic 628 determines whether the request from execution unit 605 hits or misses L2 cache 603.

Control logic 628 returns either a hit indication or a miss indication to execution unit 605, depending on the result from tag comparison logic 626, and the state of the indexed set as received from state comparison logic 627. It should be noted that if the state of the indexed set is paired, then both the primary set and partner set may need to be accessed by control logic 628. Whether both sets are accessed by control logic 628 and whether a hit or a miss indication is returned to execution unit 605 is discussed in more detail below with reference to FIGS. 7A and 7B.

In one embodiment of the present invention, control logic 628 retrieves any needed data lines from the system memory. In an alternate embodiment, L1 cache and controller 606 retrieves any needed data lines from the system memory. In another alternate embodiment, execution unit 605 retrieves any needed data lines from the system memory.

Figure 7A:
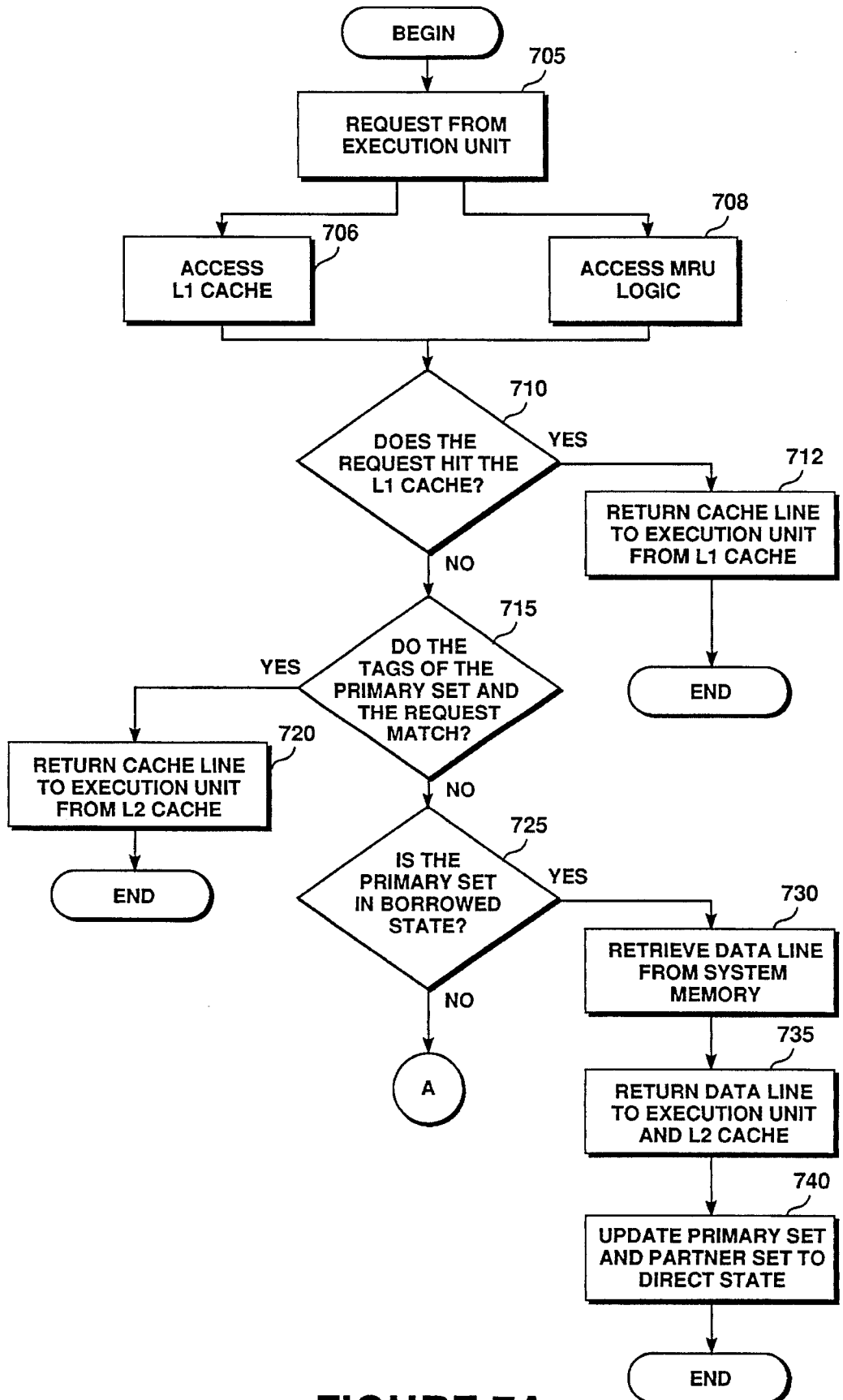
FIGS. 7A and 7B show the steps followed by one embodiment of the present invention in operating the cache memory subsystem of FIG. 6.
Figure 7B:
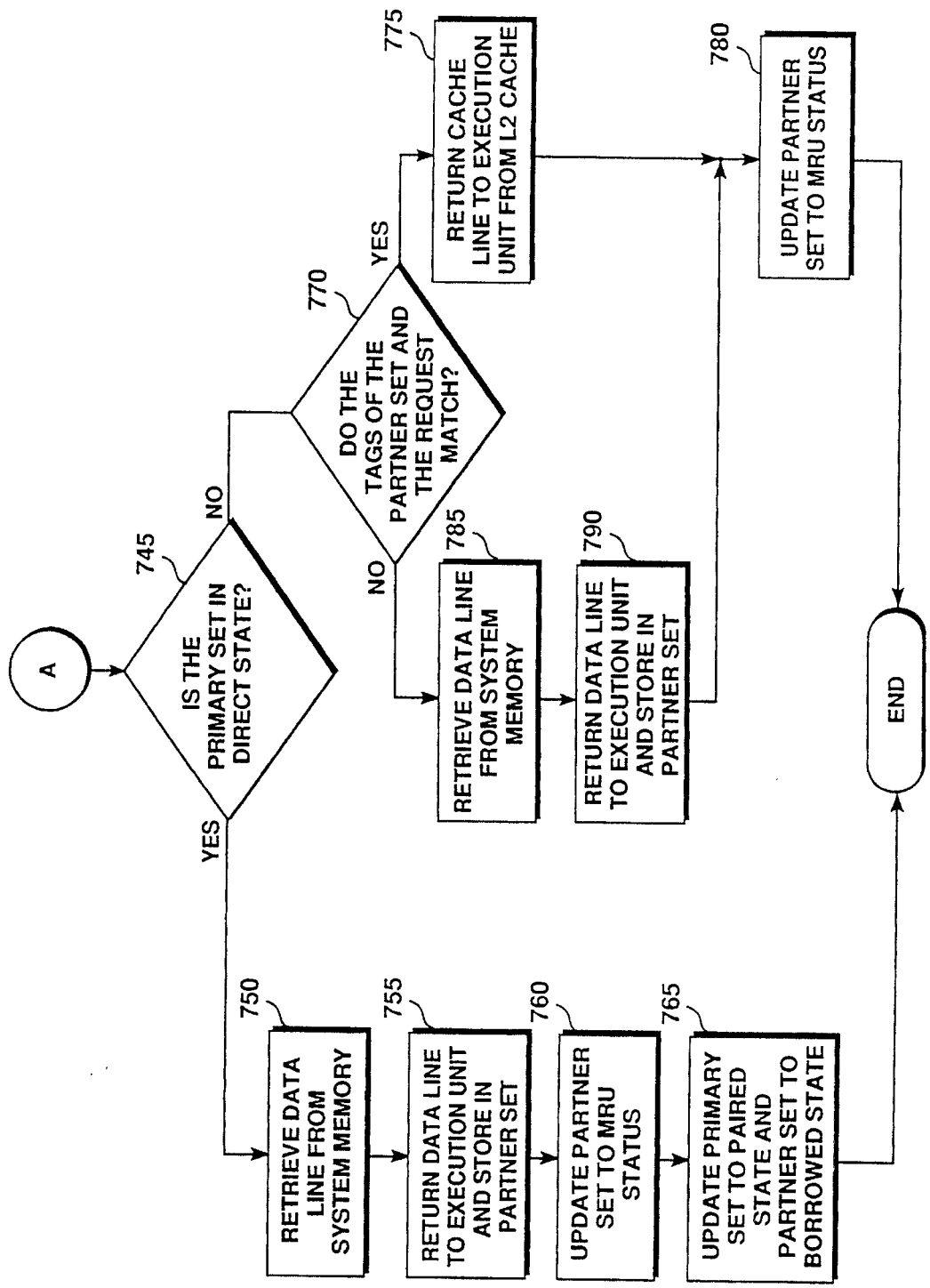

FIGS. 7A and 7B show the steps followed by one embodiment of the present invention in operating the cache memory subsystem of FIG. 6. A request from the execution unit on the processor is initially issued, step 705. This request for information is a request for a data line, or a cache line, and may comprise instruction information or data information for the processor's use. In one implementation of the present invention, this request is an address.

The request from the execution unit is input to both the L1 cache, step 706, and the MRU logic, step 708. The MRU logic accessed in step 708 indicates the primary set (that is, the most recently used set) for the indexed set in the L2 cache, which is used by the present invention if needed as discussed below. Upon receiving the request from the execution unit, the L1 cache determines whether the request hits the L1 cache, step 710. If the request hits the L1 cache, then the requested cache line is returned to the execution unit from the L1 cache, step 712.

If the request misses the L1 cache, then the tag comparison logic determines whether the tags of the primary set and the request match, step 715. This is done as discussed above, by comparing the tag field of the request from the execution unit to the tag field of the primary set within the set array of the L2 cache. If the tags match, then the requested cache line is returned to the execution unit from the L2 cache, step 720.

If, however, the tags do not match, then the control logic within the L2 cache determines whether the primary set is in borrowed state, step 725. If the primary set is in borrowed state, then the request misses the L2 cache. Thus, the requested data line is retrieved from the system memory of the computer system, step 730. This data line is returned to both the execution unit and the L2 cache, step 735. The data line retrieved from system memory is stored in the data array of the L2 cache which corresponds to the set indexed by the original request from the execution unit (that is, the primary set). The state of the primary set is then updated to the direct state, and the state of the partner set is also updated to direct state, step 740. In one implementation of the present invention, the data line is also stored in the L1 cache and controller.

Returning to step 725, if the primary set is not in borrowed state, then a determination is made as to whether the primary set is in direct state, step 745 of FIG. 7B. If the primary set is in direct state, then the requested data line is retrieved from system memory, step 750. This data line is then returned to the execution unit and stored in the partner set in the L2 cache, step 755. In one implementation, the data line is also stored in the L1 cache. The MRU logic for the primary set is then updated to indicate that the partner set is the most recently used set, step 760. The MRU logic is updated as discussed above with reference to FIGS. 5A and 5B. The state of the primary set is then updated to paired state, and the state of the partner set is updated to borrowed state, step 765.

Returning to step 745, if the partner set is in neither direct nor borrowed state, then it must be in paired state. Since a determination was already made as to whether the request hit the primary set in step 715, the determination is now made as to whether the request hits the partner set, step 770 (that is, whether the tags of the partner set and the request match). If the tags do match, then the requested cache line is returned from the L2 cache to the execution unit, step 775. The MRU logic is then updated to indicate that the partner set is the most recently used set, step 780. The MRU logic is updated as discussed above with reference to FIGS. 5A and 5B.

However, if the tags do not match, then the requested data line is retrieved from system memory, step 785. This data line is returned to both the execution unit and stored in the partner set in the L2 cache, step 790. In one implementation, the data line is also stored in the L1 cache. The MRU logic is then updated to indicate that the partner set is the most recently used set, step 780, as discussed above.

Figure 8:
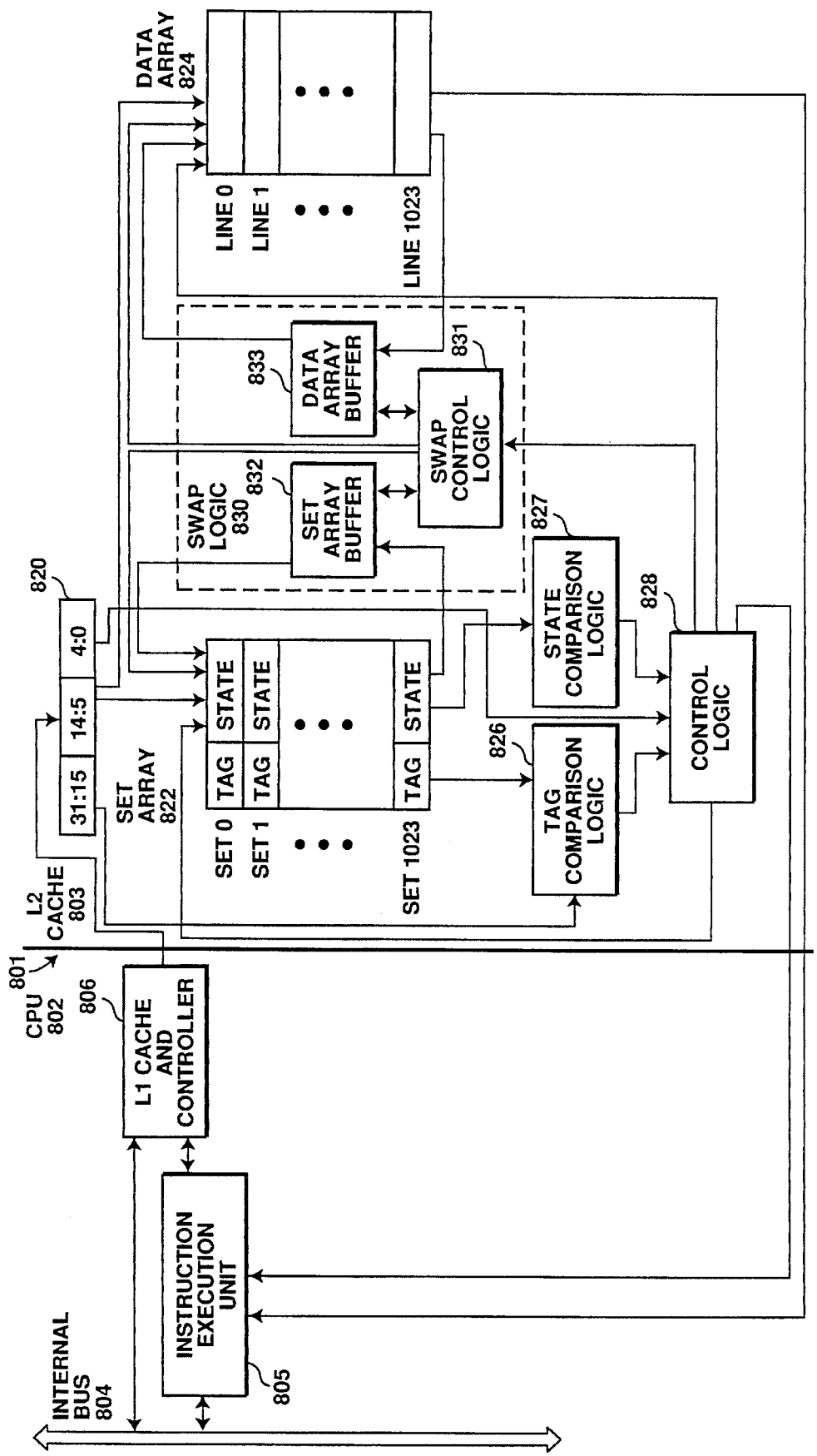
FIG. 8 is a block diagram of a cache memory subsystem in another embodiment of the present invention.

FIG. 8 is a block diagram of a cache memory subsystem in another embodiment of the present invention. The cache memory subsystem of FIG. 8 is similar to the system of FIG. 6, including a CPU 802 and an L2 cache 803 separated by boundary line 801. CPU 802 includes an internal bus 804, instruction execution unit 805, and L1 cache and controller 806. The operation of these components is as discussed above with reference to FIGS. 4 and 6. It should be noted however, that CPU 802 does not include MRU logic analogous to MRU logic 607 of FIG. 6. The embodiment of FIG. 8 ensures the most recently used set is the primary set by swapping cache lines when necessary, as discussed in more detail below.

L2 cache 803 is similar to L2 cache 603 of FIG. 6. L2 cache 803 includes a set array 822, data array 824, tag comparison logic 826, state comparison logic 827, and control logic 828, analogous to L2 cache 603 of FIG. 6. Tag comparison logic 826 compares the tag field of the request 820 with the tag field of the indexed set from set array 822 and outputs the result to control logic 828. Similarly, state comparison logic 827 determines the state of the indexed set in set array 822, and outputs the result to control logic 828. In the embodiment of FIG. 8, the primary set is the set indexed by the request from execution unit 805, without any modification based on MRU logic.

L2 cache 803 also includes swap logic 830, which is coupled to control logic 828, set array 822 and data array 824. In the embodiment of FIG. 8, the most recently used set is always maintained in the set which is in paired state. Thus, no additional MRU indicator such as a bit map is required to determine which set is the most recently used set.

Swap logic 830 includes swap control logic 831, set array buffer 832, and data array buffer 833. Set array buffer 832 is a conventional buffer which is a temporary storage location for the tag field and other data stored in a set of set array 822.

Data array buffer 833 is a conventional buffer which is a temporary storage location for the cache line stored in an element of data array 824. Swap control logic 831 controls transferring the information from set array 822 and data array 824 from one set to another set. Swap logic 830 switches two sets when indicated to do so by control logic 828. This may occur in two situations. The first is when the indexed set is in direct state but the request misses the cache. In this situation, the requested line is retrieved from system memory and stored into the partner set of L2 cache 803. The partner set and the indexed set are then swapped as discussed in more detail below with reference to FIGS. 9A and 9B. Similarly, if the indexed set is in paired state, and the request misses the primary set, then either a cache line is retrieved from system memory into the partner set and a swap must occur, or the request hits the partner set, in which case the partner set is most recently used and a swap occurs. This is discussed in more detail below with reference to FIGS. 9A and 9B.

Figure 9A:
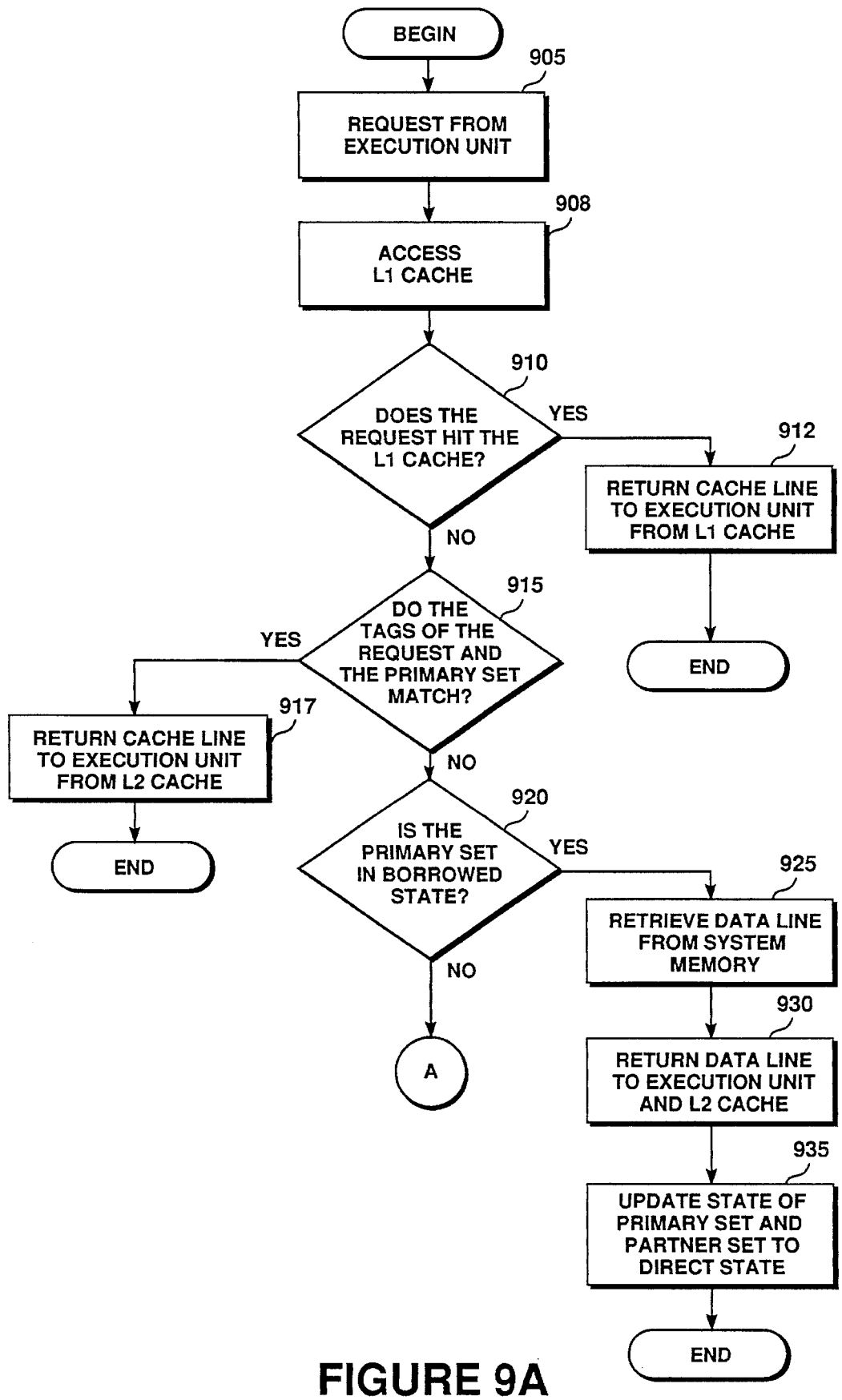
FIGS. 9A and 9B show the steps followed by one embodiment of the present invention in operating the cache memory subsystem of FIG. 8.
Figure 9B:
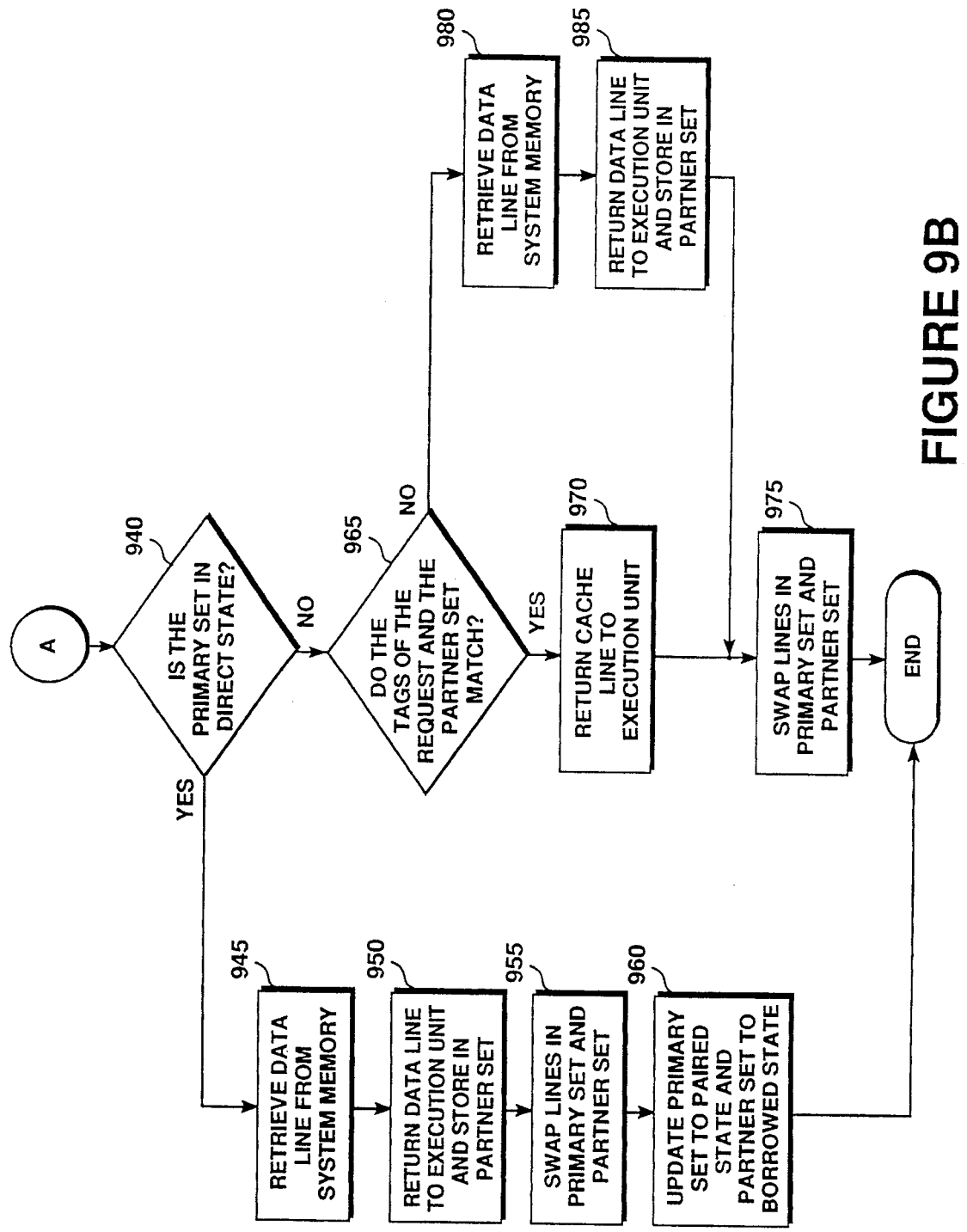

FIGS. 9A and 9B show the steps followed by one embodiment of the present invention in operating the cache memory subsystem of FIG. 8. A request is originally issued from the execution unit on the processor, step 905. In one implementation of the present invention, this request is in the form of an address. Based on this request, the L1 cache is accessed, step 908. If the request hits the L1 cache, step 910, then the requested cache line is returned to the execution unit from the L1 cache, step 912.

However, if the request misses the L1 cache, then the request is sent to the L2 cache, and the tag comparison logic determines whether the tags of the request and the primary set match, step 915. If the tags match, then the request hits the L2 cache and the requested cache line is returned from the L2 cache to the execution unit, step 917. However, if the tags do not match, then the L2 cache examines the state of the primary set.

The state comparison logic determines if the primary set is in borrowed state, step 920. If the primary set is in borrowed state, then the data line is retrieved from the system memory, step 925. The data line is then returned to the execution unit and the L2 cache, step 930. In one implementation, the data line is also stored in the L1 cache. The L2 cache stores this data line in the primary set, and updates the state of both the primary set and the partner set to direct, step 935.

Returning to step 920, if the primary set is not in borrowed state, then the state comparison logic determines whether the set is in direct state, step 940 of FIG. 9B. If the primary set is in direct state, then the data line is retrieved from system memory, step 945. The data line is then returned to the execution unit and also stored in the partner set in the L2 cache, step 950. In one implementation, the data line is also stored in the L1 cache. The swap logic within the L2 cache then swaps the lines between the primary set and the partner set, step 955. The state of the primary set is then updated to paired state and the state of the partner set is updated to borrowed state, step 960. Thus, it can be seen that by retrieving the data line from system memory into the partner set and then swapping the partner set and the primary set, the primary set contains the most recently used cache line.

Swap control logic swaps the lines of the primary set and the partner set by switching the two data lines in the data array, as well as the associated tags (and any other parity bits) of the set array. It should be noted that the state information stored in the set array is not switched. This swapping can be performed in any of a wide variety of conventional manners. For example, in one implementation of the present invention, the information in the data and set arrays of the primary set to be swapped is transferred from the two arrays into buffers within the swap control logic. The information in the data and set arrays of the partner set to be swapped is then transferred into the primary set of the arrays. The information stored in the swap buffers is then transferred into the partner set of the arrays, thereby switching the data and information contained in the primary and partner sets.

Returning to step 940, if the primary set is not in direct state, then the tag comparison logic determines whether the tags of the request and the partner set match, step 965. If the tags match, then the requested cache line is returned from the partner set to the execution unit, step 970. The swap control logic within the L2 cache then swaps the line in the primary set and the partner set, step 975. Thus, the primary set remains in paired state and the partner set remains in borrowed state, with the primary set containing the most recently used cache line.

Returning to step 965, if the tags do not match, then the requested data line is retrieved from system memory, step 980. The requested data line is retrieved from system memory and returned to the execution unit and stored in the partner set in the L2 cache, step 985. In one implementation, the data line is also stored in the L1 cache. The swap control logic within the L2 cache then swaps the lines of the primary set and the partner set, step 975.

Thus, in the embodiment shown in FIGS. 9A and 9B it can be seen that when the request misses both the primary set and partner set, the requested data line is retrieved from system memory, stored in the partner set of the indexed set, and then the cache lines of the primary and the partner set are swapped. Thus, the primary set remains in paired state, the partner set remains in borrowed state, and the primary set contains the most recently used cache line.

In an alternate embodiment of the present invention, the L2 cache stores data lines from system memory directly into the primary set, rather than the partner set as discussed above. By storing the data lines directly into the primary set, the L2 cache avoids having to swap the primary and partner sets.

It should be noted that although the descriptions above do not discuss updating the L1 cache when the request misses the L1 cache but hits the L2 cache, the cache line hit in the L2 cache may be stored in the L1 cache in addition to being returned to the instruction execution unit of the CPU. Whether the L1 cache is updated in this situation is dependent on the cache policy employed, as is understood by those skilled in the art.

It should also be noted that the descriptions above discuss a computer system having both an L1 cache and an L2 cache. It should be understood, however, that systems having only a single cache can utilize the cache memory of the present invention.

Similarly, the descriptions above describe the cache memory of the present invention as implemented in an L2 cache. However, it will be appreciated that the teachings of the present invention are applicable to any level cache, and are not specifically limited to L2 caches. For example, a system having only an L1 cache would be implemented as discussed above, although the request from the instruction execution unit is checked to hit only one cache rather than two caches. It will be understood by those skilled in the art that when utilizing the present invention in an L1 cache, the MRU information is not available from the MRU indicator simultaneously with the address being input into the cache.

Furthermore, the descriptions above describe a cache memory which transfers a cache line to the system memory when a data line needs to be brought in from the system memory. Other cache policies, however, may be employed within the spirit and scope of the present invention. For example, in one embodiment of the present invention, whenever a cache line is updated in the cache memory, the cache line may also be updated in the system memory. Thus, no transfer of the cache line to system memory occurs when a data line is transferred into that cache location because the system memory already contains a copy of the cache line.

Thus, a cache memory subsystem of the present invention provides the advantages of both a direct-mapped cache and a two-way set-associative cache. The lower power consumption and logic complexity of the direct-mapped cache are combined with the better hit ratios of the two-way set-associative cache. In addition, in one embodiment of the present invention, certain requests can be determined to miss the cache without accessing the IC package containing the cache, thereby increasing the speed of the miss indication response.

In addition, it will be understood by those skilled in the art that although the descriptions above discuss a cache which can behave as a two-way cache, other multiple-way caches are within the spirit and scope of the present invention. For example, the teachings of the present invention can be applied to a conventional two-way cache, thereby creating a four-way cache which combines the advantages of a two-way cache and a four-way cache.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, a two-way set-associative cache memory has been described.

What is claimed is:

1. A cache index for indicating whether an input address is contained in a data array of a cache memory system, wherein said data array comprises a plurality of elements, said cache index comprising:

a plurality of data sets, each data set corresponding to an element of said data array;

a first set of said plurality of data sets having a first tag and a first state;

said first tag comprising a first plurality of bits indicating the identity of a first cache line stored in a first element of said plurality of elements of said data array; and said first state comprising a first state indicator indicating a number of cache lines which are mapped into said first set, wherein each of said cache lines corresponds to an element of said data array.

2. The cache index of claim 1, wherein said first state being in a direct state indicates a single line is mapped into said first set.

3. The cache index of claim 1, wherein said first state being in a paired state indicates both a first line and a second line are mapped into said first set.

4. The cache index of claim 1, wherein said first state being in a borrowed state indicates no lines are mapped into said first set.

5. The cache index of claim 1, further comprising a second set, wherein said second set is one of said plurality of data sets, and said second set includes a second tag comprising a second plurality of bits and a second state.

6. The cache index of claim 5, wherein if both a first line and a second line are mapped into said first set, said first plurality of bits references said first line and said second plurality of bits references said second line.

7. The cache index of claim 1, wherein said cache index comprises a tag array and a state array.

8. A cache memory subsystem for use in a computer system, said computer system having a central processing unit (CPU), said cache memory subsystem comprising:

a data array having a plurality of elements; and a set array including, a plurality of sets, wherein each set of said plurality of sets corresponds to a single element of said data array, a first set including a first tag field and a first state field, and a second set including a second tag field and a second state field, and wherein said first state field indicates a number of cache lines mapped into said first set and said second state field indicates a number of cache lines mapped into said second set.

9. The subsystem of claim 8, further comprising a bit map corresponding to said first set, said bit map indicating whether said first set has been accessed by said CPU more recently than said second set.

10. The subsystem of claim 9, wherein said bit map receives as input from said CPU a second plurality of bits which uniquely identify a third set of said set array, and outputs a most recently used set bit indicating whether said first set or said second set is the most recently used set.

11. A cache memory subsystem for use in a computer system, said computer system having a central processing unit (CPU), said cache memory subsystem comprising:

a data array having a plurality of elements;

a set array including, a plurality of sets, wherein each set of said plurality of sets corresponds to a single element of said data array, a first set including a first tag field and a first state field, and a second set including a second tag field and a second state field;

a most recently used set (MRU) indicator corresponding to said first set indicating whether said first set has been accessed by said CPU more recently than said second set, wherein said MRU indicator is a bit map; and an exclusive-or gate, wherein said bit map receives as input from said CPU a second plurality of bits, said second plurality of bits being all bits of a third plurality of bits except the most significant bit of said third plurality of bits, wherein said third plurality of bits uniquely identifies a third set of said set array and said bit map outputs a single bit, said single bit and said most significant bit being input to said exclusive-or gate, said exclusive-or gate outputting a MRU bit indicating whether said first set or said second set is the most recently used set.

12. The subsystem of claim 8, wherein said first state field and said second state field are each in one of three possible states, said three possible states being a direct state, a borrowed state, and a paired state.

13. The subsystem of claim 9, wherein said MRU indicator initially indicates said first set is most recently used and is modified to indicate said second set is most recently used in response to a request to said cache memory subsystem from said CPU when said first state field is in a paired state.

14. The subsystem of claim 9, wherein said MRU indicator initially indicates said first set is most recently used and is modified to indicate said second set is most recently used in response to a request to said cache memory subsystem when said first state field is in a direct state and said request is not located in said first set.

15. The subsystem of claim 9, wherein said MRU indicator and said CPU are included in the same integrated circuit package.

16. The subsystem of claim 15, wherein said first state field and said second state field are included in said integrated circuit package.

17. A cache memory subsystem for use in a computer system, said computer system having a central processing unit (CPU), said cache memory subsystem comprising:
   a data array having a plurality of elements;
   a set array including,
      a plurality of sets, wherein each set of said plurality of sets corresponds to a single element of said data array, a first set including a first tag field and a first state field, and a second set including a second tag field and a second state field; and
      a swap control unit for swapping a first cache line and a second cache line, said swapping including placing a first cache line initially located in a first element of said data array into a second element of said data array, and placing a second cache line initially located in said second element into said first element.

18. The subsystem of claim 17, wherein said first state field and said second state field are each in one of three possible states, said three possible states being a direct state, a borrowed state, and a paired state.

19. The subsystem of claim 18, wherein said swap control unit performs said swapping in response to a request to said cache memory subsystem from said CPU when said first state field is in said paired state.

20. The subsystem of claim 18, wherein said swap control unit performs said swapping in response to a request to said cache memory subsystem from said CPU when said first state field is in said direct state and said request is not located in said first set.

21. A method of returning a data line requested by a central processing unit (CPU) of a computer system to said CPU, said computer system including a system memory and a cache memory subsystem, said cache memory subsystem including a level one (L1) cache and a level two (L2) cache, said L2 cache having a plurality of cache lines, wherein each cache line of said plurality of cache lines is a partner cache line to another cache line of said plurality of cache lines, said method comprising the steps of:
   (a) determining whether said data line is stored in said L1 cache;
   (b) returning said data line to said CPU, provided said data line is stored in said L1 cache;
   (c) determining whether the cache line in said L2 cache corresponding to said data line is in a borrowed state;
   (d) retrieving said data line from said system memory and storing said data line in said L2 cache in the cache line corresponding to said data line; and
   (e) updating the state of said cache line to a direct state.

22. The method of claim 21, further comprising the steps of:
   determining whether said cache line in said L2 cache is the data line requested by said CPU; and
   determining whether said cache line in said L2 cache corresponding to said data line is in a direct state.

23. The method of claim 22, further comprising the step of returning said cache line from said L2 cache to said CPU.

24. The method of claim 22, further comprising the steps of:
   retrieving said data line from said system memory and storing said data line in said L2 cache in the cache line corresponding to said data line;
   returning said data line to said CPU;
   updating the state of said cache line to a paired state; and
   updating the state of said partner cache line to a borrowed state.

25. The method of claim 22, further comprising the steps of:
   determining whether the cache line in a least recently used set of a primary set and a partner set is the requested data line; and
   updating said least recently used set to be the most recently used set.

26. The method of claim 25, further comprising the step of returning said cache line from said least recently used set of said L2 cache to said CPU.

27. The method of claim 25, further comprising the step of retrieving said data line from said system memory and storing said data line in said L2 cache in the cache line corresponding to said data line.

28. The method of claim 25, wherein said step of updating said least recently used set comprises swapping said least recently used set and said most recently used set.

29. A computer system comprising:
   a bus;
   a central processing unit (CPU) coupled to said bus; and
   a cache memory subsystem including,
      a data array having a plurality of elements,
      a set array including a plurality of sets, wherein each set of said plurality of sets corresponds to a single element of said data array, a first set including a first tag field and a first state field, and a second set including a second tag field and a second state field, and wherein said first state field indicates a number of cache lines mapped into said first set and said second state field indicates a number of cache lines mapped into said second set.

30. The system of claim 29, further comprising means for maintaining an MRU indicator corresponding to said first set indicating whether said first set has been accessed by said CPU more recently than said second set.

31. A computer system comprising:
   a bus;
   a central processing unit (CPU) coupled to said bus;
   a cache memory subsystem including,
      a data array having a plurality of elements,
      a set array including a plurality of sets, wherein each set of said plurality of sets corresponds to a single element of said data array, a first set including .a first tag field and a first state field, and a second set including a second tag field and a second state field; and
      means for maintaining a most recently used (MRU) set, said MRU set being either said first set or said second set, said means for maintaining comprising a swap control unit for swapping a first cache line and a second cache line, said swapping including placing a first cache line initially located in a first element of said data array into a second element of said data array, and placing a second cache line initially located in said second element into said first element.

32. The system of claim 29, wherein said first state field and said second state field are each in one of three possible states, said three possible states being a direct state, a borrowed state, and a paired state.

* * * * *